United States Patent [19]

Kudelski et al.

[11] 4,415,912
[45] Nov. 15, 1983

[54] RECORDING METHOD AND RECORDING APPARATUS TO RECORD, ON A GREY SCALE, REPRESENTATIONS OF IMAGES UNDER CONTROL OF ELECTRICAL COMMAND SIGNALS

[75] Inventors: Stefan Kudelski, Le Mont-sur-Lausanne; Jean-Claude Schlup, Cheseaux-sur-Lausanne, both of Switzerland

[73] Assignee: Robert Bosch GmbH, Stuttgart, Fed. Rep. of Germany

[21] Appl. No.: 223,000

[22] Filed: Jan. 6, 1981

[51] Int. Cl.³ .................... G01D 15/08; H04N 1/22
[52] U.S. Cl. .................... 346/154; 346/163; 358/297
[58] Field of Search .......... 346/74 R, 74 PH, 157, 346/162–164; 358/297–299; 219/216

[56] References Cited

U.S. PATENT DOCUMENTS 2,542,152  2/1951  McConnell ............... 358/298
4,092,650  5/1978  Hinz ......................... 346/163 X Primary Examiner—Thomas H. Tarcza
Attorney, Agent, or Firm—Frishauf, Holtz, Goodman & Woodward

[57] ABSTRACT

To render the grey scale of recording on an electrosensitive recording medium (16) independent of voltage applied by an electrode (22) while maintaining a predetermined relationship between a command voltage ($U_c$) and the resulting grey scale of the recording, the command voltage ($U_c$) is compared in a comparator (44) with energy being supplied from an external source through a coil (32) having a primary winding (34) to which a capacitor (36) is connected in parallel to form an oscillatory circuit by a transistor (40). Upon controlling the transistor to conduction, for example in pulses supplied by a pulse source (48), energy will be stored in the L/C circuit 34/36 until the transistor is controlled to cut off when the command signal ($U_c$) and a signal across a dropping resistor (42) indicates a predetermined relationship, for example equality, and representative of the energy required to burn out an area of the metalized coating corresponding to the selected grey scale. Transition of the transistor (40) to cut off or blocking state results in a pulse being transmitted to a secondary winding (50) coupled with the primary (34) of the coil, the secondary being coupled to the writing electrode. Thus, the voltage across the writing electrode (22) and the metalized coating (20) of the recording carrier (16) will be independent of the applied signal, but the energy content thereof varying in accordance with the applied signal. The result will be a burn-out trace, the width of which underneath the recording stylus varies (see FIG. 3) in accordance with applied energy, leaving variable amounts of non-removed metalized coating on the carrier, thus resulting in a grey tone, similar to half-tone printing, of the applied command signal.

20 Claims, 3 Drawing Figures

RECORDING METHOD AND RECORDING APPARATUS TO RECORD, ON A GREY SCALE, REPRESENTATIONS OF IMAGES UNDER CONTROL OF ELECTRICAL COMMAND SIGNALS

Reference to related applications:
U.S. application Ser. No. 222,998, filed Jan. 6, 1981, KUDELSKI and SCHLUP, entitled "MULTICOLOR RECORDING CARRIE AND METHOD OF RECORDING", U.S. application Ser. No. 222,999, filed Jan. 6, 1981, JUNG and MALL, entitled "MULTICOLOR AND GREY TONE RECORDING CARRIER AND METHOD OF RECORDING", Thermographic recording paper, and apparatus, to which the present invention relates is described and claimed in U.S. Pat. Nos. 3,831,179, Brill et al; 3,936,545, Brill et al; 4,143,582, Brill et al; and U.S. Ser. No. 034,258, Brill et al, filed Apr. 30, 1979, now U.S. Pat. No. 4,241,356, all assigned to the assignee of the present application.

The present invention relates to a method to record on an electrosensitive recording carrier signals representative of an image, in grey scale reproduction, by burning off a metalized coating on a substrate.

BACKGROUND AND PRIOR ART

The referenced patents describe recording carriers and recording apparatus using the burn-off process of a metalized coating. Different grey-scale tones can be obtained by varying the voltage applied to the writing or recording electrodes. By changing the applied voltage, the size of the burned-out area is changed. If the image to be recorded is built as a composite of individual points of a pattern, the size of the points will vary.

The method as described is difficult to apply in actual practice, since the relationship between applied voltage and the degree of grey-scale toning is highly non-linear. Particularly if the voltage is low, a continuous relationship between voltage change and grey-scale reproduction cannot be unambiguously and reproducibly insured. With certain surface characteristics, and under low-voltage operating conditions, for example 18–20 V, the recording electrode operates in the form of a non-electric weld-type burner, which cuts out the writing trace from the recording carrier. In such operation, there is a tendency for metallic particles to adhere at the contact zone of the recording electrode. Non-metallic particles also may adhere. Consequently, formation of a recording track in which there is a predetermined relationship between applied voltage and size of the burn-out area cannot be obtained. If the voltage is increased, for example over 20 V, the formation of the writing trace changes. An arc forms between the recording electrode and the electrosensitive coating on the recording carrier. This arc, initially, has quite low energy content and is not capable of always completely vaporizing the metal which is to be removed. Consequently, the surfaces of the recording trace or, in the case of point recording, the various points of the pattern, do not reach values which have a predetermined correspondence with the amplitude of an applied recording signal; and, consequently, the grey-tone representation likewise will not unambiguously and reproducibly correspond to the applied signal. When the recording voltage exceeds a predetermined value, for example about 22 V, then the material to be removed is reliably completely vaporized. The process of burning-out of the recording track, up to complete black reproduction, will then be in accordance with the applied signals.

In various known processes, it is possible that oxide layers, which have been formed on the metallic coating of the recording carrier undesirably influence the quality of the reproduction of the image. Such oxide layers increase the transition resistance between the recording electrode and the metal coating and thus decrease the recording current or, in limiting cases, may even completely interrupt it.

THE INVENTION

It is an object to provide a method, and an apparatus to carry out the method,, in which grey-scale of reproduced signals will unambiguously and reproducibly be a function of the applied signal, so that even light-grey tones can be accurately reproduced under control of signals which are weak and insufficient to, by and themselves, cause operation of the system resulting in reliable vaporization of the material to be removed.

Briefly, electrical energy representative of the signal is stored, for example in a coil having two secondaries. The amount of electrical energy which is stored is applied, under control of an application signal, to the electrode. The energy stored will be representative of the grey-scale of the signal; the voltage, however, will always be high enough to cause complete vaporization or sublimation, respectively, of the metallic layer therebeneath.

Sublimation is defined for example in Chamber's Technical Dictionary (Macmillan Co.; third edition, 1958), as: The vaporization of a solid without the intermediate formation of a liquid.

Perferably, and in accordance with the invention, only so much of the energy as corresponds to the signal to be recorded is stored and applied to the electrode. By varying the energy, the size of the burn-out point upon occurrence of any discharge is controlled.

The apparatus, in accordance with a feature of the invention, includes a transformer in a circuit which can be generally similar to the ignition circuit for an externally ingnited internal combustion engine, for example of the automotive type, in that it includes a coil similar to an ignition spark coil in a circuit which is controlled by a transistor which, when rendered conductive, permits passage of current through the coil to store electromagnetic energy therein. Upon cut-off or blocking of the transistor, a pulse is induced in the secondary of the coil to cause an ignition pulse to be applied to the electrode.

The system and the method have the advantage that each recording pulse will insure complete vaporization or sublimation, respectively, of the metallic coating beneath the electrode; the energy to be supplied at each ignition pulse, however, can be accurately measured. A continuous dependence between the value of the recording signals and the size of the burned-out area on the substrate, that is, the size of individual points on a pattern, can be accurately controlled over a wide range. Moving the recording carrier and the electrode relative to each other, and providing recording pulses at a given frequency, will then result in either fine points spaced from each other by substantial areas of metallic coating, large points spaced by only small areas of intervening metallic coating, or a rather wide continuous burned-out track.

The sudden release of stored energy at each writing pulse upon blocking the control transistor results in vaporization of the material of the metal coating to be removed independently of the stored energy, since it is the voltage occurring at each recording pulse which controls the vaporization. Thus, image areas which are to have a light toning—corresponding to widely spaced small burned-out dots, can be exactly reproduced.

In accordance with a preferred feature of the invention the required energy is stored in the magnetic field of a coil and can be released at a voltage level which is higher than that which is required to form an arc between the writing electrode and the electrosensitive coating. This voltage then can be used to flash through oxide layers which may have formed on the recording carrier, so that the disadvantageous influence of such oxide layers on the coating can be essentially eliminated, which further improves the quality of the reproduced image.

The respective constructional elements of the pulse source can be protected from over-voltages by bleeding-off the stored energy when this energy is not accepted by the writing electrode. The stored energy can be further re-stored in any suitable storage means and be used in further and subsequent pulses.

A simple and reliable arrangement is obtained by utilizing a measuring or sensing resistor in the primary current of the coil, and comparing the voltage across the sensing resistor, upon passage of charging current therethrough, with a command signal. When the command signal and the voltage across the sensing resistor have reached a value representative of a predetermined relationship—for example equality—then the transistor in series with the primary of the coil is caused to block, resulting in a flash-over between the recording electrode and the metalized coating. The output of the comparator, comparing the command signal with the voltage across the sensing resistor which, of course, is representative of the charging current flowing through the primary of the coil, is preferably connected to a pulse source which is controlled to provide output pulses at a given frequency so that, given an even transport speed of the recording medium, a series of dots will be written, the distance of the centers of which remaining constant and being a function of the transport speed of the recording medium and the pulse repetition frequency of the frequency source.

DRAWINGS

Figure 1:
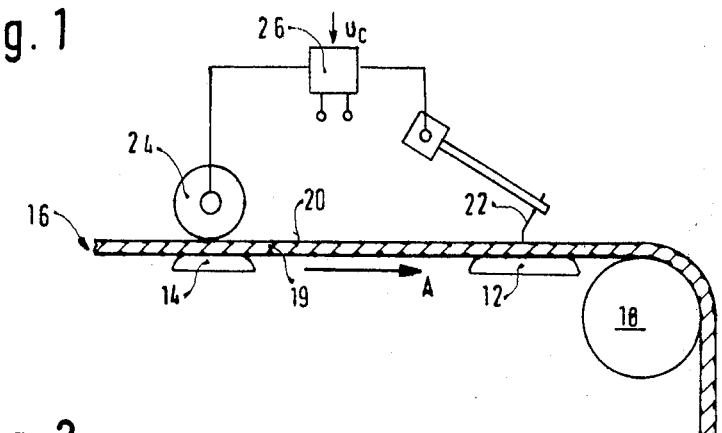
FIG. 1 is a highly schematic view of a recording system.

The recording apparatus has two fixed supports 12, 14 over which a flexible recording carrier 16 is pulled in the direction of the arrow A by a transport device 18. The recording carrier 16 uses a subtrate, which is made of an electrically insulating carrier foil 19, for example paper, on which a metalized coating 20 is applied. The substrate may also be a plastic, for example Mylar ® (oriented polyester film), or other suitable transparent or opaque insulating materials. The coating 20 may be zinc, aluminum or some other suitable material. Reference is made to the referenced patents and the applications for descriptions of suitable recording carriers.

A writing or recording electrode 22 engages the metallic coating 20 of the carrier 16 in the region of the support 12. A counter electrode 24, for example a roller extending transversely of the ribbon, tape or strip of recording carrier 16 engages the metallic surface 20 above the support 14. Roller 24 is the second electrode connected, like electrode 22, to a control element 26 which is an electrical pulse generator having applied thereto a command signal voltage $U_c$. The command signal voltage $U_c$ controls energy pulses of different intensity applied to the writing electrode 22, from which current flows over the metallic coating 20 to the counter electrode 24, and back to the pulse generator 26 to form a closed circuit. Due to the high-current density in the contact zone beneath the writing electrode 22, the metallic coating 20 is locally melted and will vaporize. Depending on the intensity of the energy pulses, the burn-out, points, that is, the degree of vaporization of the metallic coating beneath the electrode 22, will be greater or less. When looked at, a grey-toning in form of a grey-scale tone, will be perceived.

The command signal voltage $U_c$ is derived from a control apparatus—not shown—which provides signal voltages representative of or modulating a supply voltage in accordance with the grey-scale toning of individual points of the pattern to be recorded.

Figure 2:
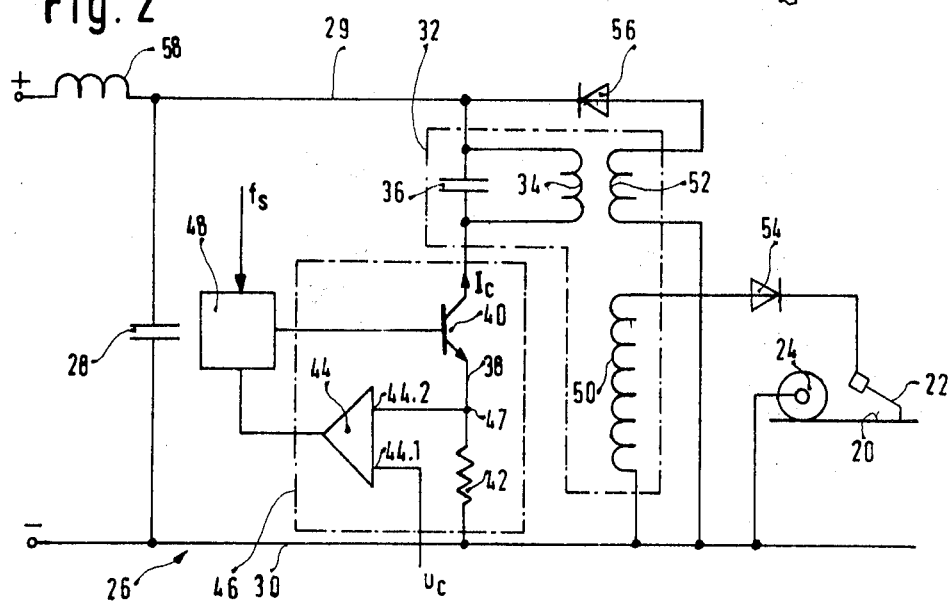
FIG. 2 is a highly schematic circuit diagram of an apparatus to carry out the method.

The unit 26 is shown in detail in FIG. 2. The unit has a constant voltage source and a filter capacitor 28 which feed positive and negative supply buses 29, 30 connected to a high-voltage transformer 32. The high-voltage transformer 32 has a primary winding 34 which, together with the capacitor 36, forms an oscillating circuit. The oscillating circuit 34, 36 is connected to the buses 29, 30 by a circuit connection 38 which, further, includes the collector-emitter path of an npn transistor 40 and a measuring resistance 42. Rather than using an npn transistor, a VMOS or HEXMOS transistor can also be used. The capacitor 36 and the inductance of the primary winding 34 determine the inherent oscillatingg frequency of the oscillatory circuit 34, 36. The value of the capacitor 36 can easily experimentally be determined.

The transistor 40 and the measuring resistor 42 are connected to a common junction 47. Transistor 40, measuring resistor 42 and a comparator, for example an operational amplifier 44 connected as a comparator, form, together, a control unit 46 which controls and monitors the duration of conduction of transistor 40 as a function of a writing command signal $U_c$.

The command signal voltage $U_c$ is connected to a first input 44.1 of the operational amplifier 44; the second input 44.2 thereof is connected to the junction 47 formed by the emitter terminal of transistor 40 and one terminal of resistor 42, the other terminal of which is connected to the negative bus 30.

The apparatus of FIG. 2 further includes a pulse source 48 which controls the base of the transistor 40 to become conductive. The control to conduction recurs, for example, each 100 microseconds. Comparator 44 delivers a signal to the pulse source 48 which controls transistor 42 to cut off when the voltage at the second input 44.2 is equal to the command signal $U_c$ at the input 44.1. The command frequency $f_s$ of the pulse control applied to pulse source 48 is adjustable.

The transformer 32 has two secondary windings 50, 52, one terminal of which is commonly connected to bus 30. The other terminal of secondary 50 is connected over diode 54 to the writing electrode 22. The other terminal of secondary 52 is connected over a feedback circuit including diode 56 to the bus 29. Diode 56 responds only when the voltage exceeds a certain level, that is, under over-voltage conditions, which might cause interruption of the writing circuit. The arrangement can also be so made that the feedback circuit transfers any energy which is not accepted at the writing electrode 22, upon discharge of the oscillatory circuit into the capacitor 28 for storage for the next writing pulse, avoiding destruction of components.

The second winding 52 and diode 56 are not strictly necessary. Rather, the secondary 50 of the transformer 32 may include an element to absorb any excess voltage energy, for example a Zener diode and a dissipating resistor. Such an arrangement, although simpler, is inefficient with respect to energy conservation since excess energy is dissipated.

Figure 3:
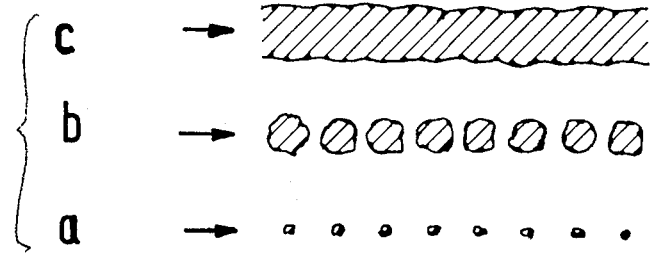
FIG. 3 shows three resulting recording traces under different operating conditions.

Operation, with additional reference to FIG. 3: Let it be assumed that a signal $f_s$ is applied to pulse source 48 at a predetermined instant of time which controls transistor 40 to become conductive, Current $I_c$ will begin to flow in line 38, which charges the circuit 34/36 and causes build-up of a magnetic field in the primary 34. In this phase of the operating cycle, the necessary energy for the subsequent pulse is applied to the high-voltage transformer 32 and stored in form of the magnetic field building up in the primary winding 34, and in the charge on the capacitor 36. The control unit 46 is used to match the energy being supplied to the transformer 32 to the respectively applied command voltage $U_c$. This control is obtained by sensing the voltage at junction 47 in line 38 and comparing this voltage with the command voltage $U_c$ in the comparator 44. The voltage across resistor 42 changes with the value of the current $I_c$ upon initiation of charging the circuit 34/36. Current $I_c$, of course, is the same current flowing through the transistor 40. The voltage at junction 47 will rise—with respect to the level of bus 30—steadily with respect to the voltage at bus 29 until a certain voltage level is reached which will match that of the command voltage $U_c$, or have a predetermined relationship with respect thereto. When the predetermined relationship between the voltage $U_c$ and the voltage at junction 47 is obtained, comparator 44 will provide an output signal to the pulse source 48 which causes change of the transistor into blocked state. Thus, energy stored in the oscillatory circuit 34/36 is transferred in form of a writing current to the secondary 50. The energy which was stored will depend on the signal voltage $U_c$; the voltage, however, will depend only on the rate of change of the magnetic field in the primery 34, which depends on the rate of damping caused by the current flow in the secondaries 50, 52. Consequently, and independently of the value of the quantity of energy which is stored, the voltage can increase up to a value, on which oxid layers formed on the recording carrier get flashed through. After that, the metallized coating of the recording carrier will conduct and the stored energy will be available for recording.

Contamination of the recording electrode 22, for example by deposits thereon and the like, is thus effectively avoided. This arrangement insures that the areas which are burned out or exposed, that is, the pattern dots, correspond in their size to the command signal voltage $U_c$, and thus correspond in size to the dot which is desired, based on the original.

If, for some reason, the writing current circuit 50-54-22-20-24-30 is interrupted, energy is transmitted over diode 56 into the filter capacitor 28. Thus, energy is fed back for storage, while preventing damage or destruction of the transistor 40. The d-c source, schematically indicated by the signs + and − is additionally separated by a choke coil 58, forming a barrier.

The frequency $f_s$ of the pulse source can be set to take care of parametes which influence the quality of reproduction; for example, the frequency can be matched, with respect to the relative movement between the writing electrode and the recording carrier 16, as it is transported over transport 18, so that the respective burn-out points of the pattern will appear at desired distances from each other. The command voltage $U_c$ can be transferred to the apparatus, and specifically to the control unit 46 thereof in any desird manner, for example by cables, wireless transmission, or the like; the command voltage itself is a varying signal which will be representative, for example directly representative, of a grey-tone scale with limiting values being black and white.

In light-grey representation, the dot pattern will appear as is seen in line a of FIG. 3. Small dots, with substantial distance between the burned-out dots will define the pattern. Similarly to half-tone printing, the overall appearance will be a light grey. The diameter of the various points which are burned out of the pattern may, for example, be about 1/20 of the diameter of the writing electrode. A typical diameter for a writing electrode is, for example, about 0.15 mm. As the energy for each pulse increases, the diameter of the respective burned-out points also increases. Line b of FIG. 3 illustrates the relationship in which the burn-out points, corresponding to an intermediate grey tone, have increased. A suitable distance between writing lines is, for example, about 0.18 mm. For an intermediate grey tone, the diameter of the individual points of the pattern may be, for example, 0.10 mm. The result will be a small space of metallized area between adjacent dots and a strip of metalized area between adjacent lines. For deep grey or black, the energy will be provided of such intensity that the individual adjacent points of the pattern merge within each other to form a continuous line, as illustrated in line c of FIG. 3. The diameter of the various burn-out points can no longer be determined and, if the energy is sufficient, the burn-out area will merge with the area to be burned out by an adjacent line, for example be 0.18 mm, that is, even wider than the diameter of the writing electrode 22, and thus form a completely burned-out area having a black appearance.

As is apparent, intermediate forms of burned-out point patterns of the writing tracks can be obtained. The grey scale will correspond to and be a function of the signal voltage $U_c$ since each pulse has sufficient voltage to result in complete vaporization of the material to be eliminated, the signal intensity being represented by the energy content of the pulse, and not by the initial voltage level thereof. Thus, contamination of the writing electrode is avoided. Arc-through any possibly present oxide layers on the metal coating 20 of the carrier 16 is reliably insured. It has been found that arc-through to the metal coating of an oxidized metal layer does not undesirably change the degree of toning of the recorded trace, so that the energy which is lost to effect arc-through, that is, to pass the insulating barrier of the oxide layer, is so small that it can be ignored. Effectively, the grey-scale representation obtained thus is reproducibly an analog of the applied command signal $U_c$, and effectively independent of the surface composition of the metalized surface 20 of the record carrier 16.

The pulse generator 48, under control of the control unit 46, thus provides electrical energy which is stored in the storage circuit 34/36. Only so much of the energy is stored as is required for the particular size of the particular dot to be burned off by comparing the command signal $U_c$ with the voltage across the resistor 42, which will be representative of the energy being stored. In case of interruption of the writing current circuit caused by highly efficient oxide layers formed on the recording carrier, or in case of absence of the recording carrier, energy can be re-stored in the capacitor 28 for subsequent use in a later-commanded pulse.

The circuit of the coil 32, with the capacitor 36 therein, forms an oscillatory circuit which is well known and used in externally ignited internal combustion engines, and has been found reliable and effective therein. The transistor 40, preferably, is a bipolar transistor which is connected as shown in the primary circuit of the coil 32. The use of two secondary windings 50, 52 permits operation of the recording system in accordance with the method with minimum use of energy since any excess is restored in capacitor 28, isolated from the supply lines by choke 58 for use in a subsequently occurring pulse.

Various changes and modifications may be made within the scope of the inventive concept.

In one embodiment, the voltage across the buses 29, 30 was: 10 V, the coil 32 was a coil having a RM6/3H1/A1250 core, with 60 turns of the primary winding 34, 119 number of turns for secondary winding 50 and 18 number of turns for the other secondary winding 52. The capacitor 36 had 4,7 nF capacity. Upon sudden interruption of primary current by transistor 40 which was a 2N4033 transistor, a voltage at electrode 22 of 27 to 70 V is generated which, in case of oxide coatings or interruptions, may rise to 250 V, so that a diode 56 is suitable. The power storage capacitor 28 had 39 μF. The choke 58 had about 1 mHy inductance.

The foregoing described method of recording is also practicable in combination with recording carrier containing color information—see the cross-referenced application entitled "Multicolor Recording Carrier and Method of Recording", KUDELSKI and SCHLUP, Ser. No. 222,998 filed Jan. 6, 1981.

We claim:

1. Method of recording images in grey-scale representation, of variable command signals ($U_c$) in which a recording medium (16), having an insulating substrate (19) with a metallized coating (20) thereon, is passed beneath a recording electrode (22) which, when energized by an electrical burn-out signal under control of said command signal burns off a portion of the metallized coating, and in which the grey-scale representation of the image is obtained by modulation of said electrical burn-out signal,
comprising the steps of
storing electrical energy at a level which enables the energy to be released at a voltage level which is at least as high as that required for vaporization or sublimation of metal beneath the electrode;
applying electrical energy from the stored energy to the electrode (22) in form of pulses of said voltage level under control of said command signal;
and wherein
said application and controlling step includes controlling the energy of the pulses as a function of the lightness or darkness of an image area, within said grey scale to determine and control the size of the area being burned out beneath the electrode, upon application of a pulse to the electrode.

2. Method according to claim 1, wherein said storing step comprises
storing electrical energy under control of and as a function of said command signal.

3. Method according to claim 1, including the step of controlling the energy being stored as a function of the surface are to be burned out upon application of a pulse to the electrode.

4. Method according to claim 3, wherein the energy being stored is proportional to the size of the surface to be burned out.

5. Method according to claim 3, wherein the storing step comprises storing the required energy at a level, which enables the energy to be released at a voltage level which is higher than that required to form an arc between the writing electrode (22) and the electrosensitive coating (20) of the recording carrier (16).

6. Method according to claim 1, further including the step of sensing excess voltages between said electrode (22) and the electrosensitive coating (20) of the carrier (16);
and draining the energy of said pulses when said voltages exceed a predetermined value.

7. Method according to claim 6, wherein said draining step comprises returning said excess energy for storing said energy for use in a subsequent pulse.

8. Apparatus for recording images in grey-scale representation of a variable command signal ($U_c$) on a recording medium (16) having an insulating substrate (19) and a metallized coating (20) thereon, said apparatus including a recording electrode (22), means (18) passing said recording carrier beneath the recording electrode with the metallized coating in contact therewith, an electrical pulse generator (26) connected to said electrode (22) to form a writing circuit therewith and applying burn-out pulses to the electrode to burn out a portion of the metallized coating contacted by the electrode,
and modulating means to modulate the burn-out pulses as a function of the desired burn-out surface of the zone being burned out beneath the electrode,
comprising
a storage means (32) storing electrical pulses from the pulse generator (26) and coupled to the electrode (22),
said storage means including a voltage generating means (32) for providing pulses to said electrode, and thus providing electrical energy to the electrode under control of and as a function of said command signal,
said storage means storing and providing said pulses at a level which enables the energy to be released at a voltage level which is at least as high as that required for vaporization or sublimation of metal beneath the electrode;
and a control unit (46) connected to said command signals and to said storage means and controlling the energy being stored in the storage means (32) as a function of said command signal.

9. Apparatus according to claim 8, wherein said storage means comprises a transformer (32).

10. Apparatus according to claim 9, further including a capacitor (36) connected to the primary of the transformer and forming therewith an oscillatory circuit.

11. Apparatus according to claim 9 or 10, further comprising a pulse generator (48) connected into the primary winding circuit of the transformer (32) to provide energy to said transformer in sequential pulses.

12. Apparatus according to claim 11, wherein the control unit (46) includes a semiconductor switch (40) connected in series with the primary winding (34) of the transformer (32) and connected to and controlled by said pulse generator to provide said energy supply pulses to the transformer.

13. Apparatus according to claim 12, further including a measuring resistor (42) serially connected with the primary winding (34) of the transformer (32);

a comparator (44) connected to receive said command signal ($U_c$) and connected to said measuring resistor and providing an output when a predetermined relationship between said command signal and the signal across said measuring resistor is established, said comparator furnishing an output signal to control said semiconductor switching element (40) to current-interrupting or blocking state to cause a pulse of a voltage depending on the winding ratio of said transformer to be applied to the electrode and having an energy content depending on the energy stored in said transformer.

14. Apparatus according to claim 13, wherein said semiconductor switch is a transistor.

15. Apparatus according to claim 14, wherein said transistor is A VMOS or HEXMOS transistor.

16. Apparatus according to claim 13, wherein the output of the comparator is connected to the semiconductor switch through the pulse source (48).

17. Apparatus according to claim 8, further including means (56) sensing excess voltage conditions above a predetermined level between the writing electrode (22) and the metallized coating (20) of said recording carrier (16);

said sensing means being connected to drain excess energy upon sensing an over-voltage condition above said predetermined level.

18. Apparatus according to claim 17, further including power storage means (28) connected to receive energy drained by said sensing means, said power storage means being connected to said transformer to supply energy thereto for a subsequent writing pulse.

19. Apparatus according to claim 18, wherein the transformer (32) has two secondary windings (50, 52), one of said windings being connected to the writing electrode (22);

a voltage-sensitive element (56) and a power storage capacitor (28) being provided, the voltage-sensitive element (56) being connected to the other secondary winding (52) and further to said power storage capacitor (28) to return energy to the power storage capacitor in case of occurrence of excess voltage between the writing electrode (22) and the metalized coating (20) of the carrier, said power storage capacitor being connected to the primary of the transformer to supply energy thereto upon command of a subsequent pulse.

20. Apparatus according to claim 19, further including an isolating choke coil (58) connected between the power storage capacitor (28) and a source of energizing voltage (+; −) and the primary winding (34) of the transformer (32).

* * * * *